United States Patent [19]

Horiguchi

[11] Patent Number: 5,235,678
[45] Date of Patent: Aug. 10, 1993

[54] CIRCUIT FOR DETECTING AN END POINT OF AN ARC

[75] Inventor: Ryuji Horiguchi, Tokyo, Japan

[73] Assignee: NEC Corporation, Tokyo, Japan

[21] Appl. No.: 156,514

[22] Filed: Feb. 16, 1988

[30] Foreign Application Priority Data

Feb. 13, 1987 [JP] Japan ................................. 62-31024

[51] Int. Cl.[5] .............................................. G06F 15/62
[52] U.S. Cl. ..................................... 395/142; 395/140; 340/747
[58] Field of Search .............. 364/518, 521, 520, 702, 364/523; 340/703, 711, 720, 740, 747; 395/140, 141, 142

[56] References Cited

U.S. PATENT DOCUMENTS

| | | | |
|---|---|---|---|
| 4,149,164 | 4/1979 | Reins et al. | 340/701 |
| 4,149,165 | 4/1979 | Herman et al. | 340/740 |
| 4,648,049 | 3/1987 | Dines et al. | 364/521 |
| 4,674,059 | 6/1987 | Schrieber | 364/523 |
| 4,692,887 | 9/1987 | Hashidate | 364/720 |

Primary Examiner—Thomas C. Lee
Attorney, Agent, or Firm—Sughrue, Mion, Zinn, Macpeak & Seas

[57] ABSTRACT

A circuit for detecting an end point of an arc in XY coordinate system comprises a first register storing an X coordinate value of a given end point, a second register storing an Y coordinate value Yse of the same given end point, a third register storing a Y coordinate value Y of a coordinate point of a calculated arc pattern, a fourth register storing a Y coordinate Y of the same coordinate point of the same calculated arc pattern. A first comparator is coupled to the first register and the third register to generate a first coincidence signal when a content of the first register is coincident with a content of the third register and when a tangential angle of the calculated coordinate point is within a first angular extent. A second comparator is coupled to the second register and the fourth register to generate a second coincidence signal when a content of the second register is coincident with a content of the fourth register and when the tangential angle of the calculated coordinate point is within a second angular extent.

10 Claims, 4 Drawing Sheets

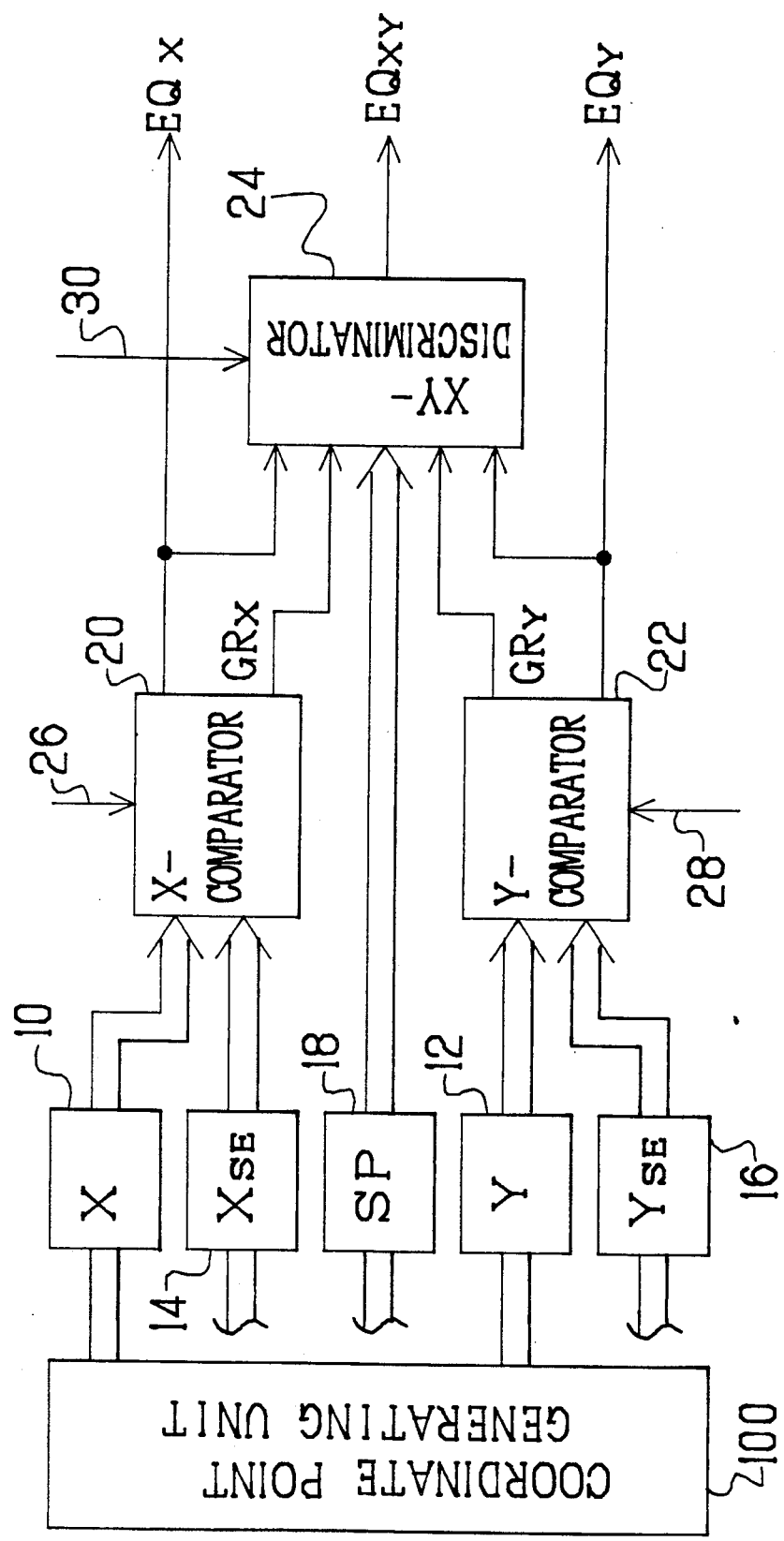

CIRCUIT FOR DETECTING AN END POINT OF AN ARC

BACKGROUND OF THE INVENTION

1. Field of the Invention

The present invention relates to a pattern drawing system, and more specifically to a circuit for detecting an end point such as a starting point and an terminating point of an arc composed of a portion of a circle or an ellipse.

2. Description of related art

Heretofore, in order to generate information for a pattern to be drawn such as a circle and ellipse at a high speed, it has been an ordinary practice to generate coordinate point values of a pattern to be required, point by point, by using a digital processing system in accordance with a circle/ellipse pattern generation algorithm known as DDA (digital differential analyzer). In the case that an arc such as a portion of a circle or ellipse is drawn in this algorithm, a starting point (Xs, Ys) and an terminating point (Xe, Ye) of the arc on a circle or ellipse to be drawn are previously given. Then, the coordinate values of the starting point and the terminating point are sequentially compared with a coordinate value (X, Y) of each point of a generated circle or ellipse pattern. Thus, the drawing is made in accordance with the generated pattern from a point of the generated pattern consistent with the given starting point to a point of the generated pattern consistent with the given terminating point. Therefore, in order to judge the consistency, it has been necessary to detect that the X coordinate and the Y coordinate of the generated pattern are consistent with the X coordinate and the Y coordinate of the start point or the end point, respectively. For example, the case of drawing an arc consisting of a portion of an ellipse as shown in FIG. 1, the X coordinate value and the Y coordinate value of the starting point and the terminating point must be precisely calculated in the following equations:

Xs or Xe = Dx cos $\theta$ + Xc
Ys or Ye = Dy sin $\theta$ + Yc where (Xs, Ys) is coordinate of a starting point;
(Xe, Ye) is coordinate of a terminating point;
(Xc, Yc) is coordinate of a center;
Dx is a diameter in a X direction;
Dy is a diameter in a Y direction;
$\theta$ is an angle formed between the X axis and a line connecting between the center and the starting point or the terminating point.

The X and Y coordinates (Xs, Ys), (Xe, Ye) obtained in the equations must lie on the circumference of an ellipse generated in accordance with the DDA algorithm.

As seen from the above, the conventional method for detecting the end point of an arc has required a precise execution of complicated arithmetic operations such as trigonometric function and multiplication in order to obtain the starting point and the terminating point. This gives a large load on the software and the hardware of the pattern drawing system. In addition, a very long time is required in preprocessing for obtaining the starting point and the terminating point, with the result that the processing speed of the system is inevitably low.

Furthermore, for detecting the starting point and the terminating point, it is necessary to make comparison on both the X coordinate value and the Y coordinate value. This needs a long detection time. In addition, there is a limitation that the coordinate values of the starting point and the terminating point have to be consistent with a coordinate value lying on the circumference of a circle or ellipse generated in accordance with the DDA algorithm. However, the coordinate values generated in the DDA algorithm are obtained in the form of an integer for simplification of the digital processing, and on the other hand, the result of the operation of the function such as the trigonometric function is obtained in the form of a real number and therefore must be rounded to an approximate integer. Accordingly, approximation error is not avoidable, which would cause a deviation from a pattern to be actually obtained. In an extreme case, the starting point and/or the terminating point could not be detected due to the approximation error, with the result that a required arc could not obtained, or an operation would continue to circulate in a straying loop which will not terminate.

SUMMARY OF THE INVENTION

Accordingly, it is an object of the present invention to provide a circuit for detecting an end point of an arc, which has overcome the above mentioned defect of the conventional one.

A further object of the present invention is to provide a circuit capable of detecting an end of an arc with a small error and with a small amount of hardware.

The above and other objects of the present invention are achieved in accordance with the present invention by a circuit for detecting an end point of an arc in XY coordinate system comprising a first register storing an X coordinate value Xse of a given end point, a second register storing an Y coordinate value Yse of the same given end point, a third register storing a Y coordinate value Y of a coordinate point of a calculated arc pattern, a fourth register storing a Y coordinate Y of the same coordinate point of the same calculated arc pattern, a first comparator coupled to the first register and the third register to generate a first coincidence signal EQx when a content Xse of the first register is coincident with a content X of the third register and when a tangential angle of the calculated coordinate point is within a first angular extent, and a second comparator coupled to the second register and the fourth register to generate a second coincidence signal EQy when a content Yse of the second register is coincident with a content Y of the fourth register and when the tangential angle of the calculated coordinate point is within a second angular extent.

Preferably, the first comparator further generates a first noncoincidence signal GRx when X is less than Xse, and the second comparator further generates a second noncoincidence signal GRy when Y is less than Yse.

More preferably, the detecting circuit further includes a first discriminator coupled to receive the first and second coincidence and noncoincidence signals EQx, EQy, GRx and GRy from the first and second comparators so as to generate a third coincidence signal EQxy when a predetermined condition is satisfied by the first and second coincidence and noncoincidence signals EQx, EQy, GRx and GRy and when the tangential angle of the calculated coordinate point is at a border between the first angular extent and the second angular extent. In addition, the detecting circuit also has a fifth register storing information about which quadrant the calculated coordinate point lies in, and the first discriminator is coupled to the fifth register.

In a specific embodiment, the first comparator generate the first coincidence signal EQx when X is equal to Xse and when the tangential angle of the calculated coordinate point is less than 45 degrees, and the second comparator generates the second coincidence signal EQy when Y is equal to Yse and when the tangential angle of the calculated coordinate point is greater than 45 degrees.

More specifically, the first comparator generate the first coincidence signal EQx when X is equal to Xse and if the angle of the calculated point to the X axis is larger than 45 degrees but less than 135 degrees, or if the angle of the calculated point is larger than 225 degrees but less than 315 degrees. The second comparator generates the second coincidence signal EQy when Y is equal to Yse and if the angle of the calculated point to the X axis is larger than 0 degree but less than 45 degrees, or if the angle of the calculated point to the X axis is larger than 135 degrees but less than 225 degrees, or if the angle of the calculated point is larger than 315 degrees but less than 360 degrees.

In addition, the first discriminator generates the third coincidence signal EQxy when a predetermined condition is satisfied by the first and second coincidence and noncoincidence signals EQx, EQy, GRx and GRy and when the angle of the calculated point to the X axis is equal to 45 degrees, 135 degrees, 225 degrees or 315 degrees.

In a more preferred embodiment, the first discriminator generates the third coincidence signal EQxy when one of the following conditions is satisfied:

(1) when the angle of the calculated point to the X axis lies in the first quadrant, X is not greater than Xse and Y is not greater than Yse;
(2) when the angle of the calculated point to the X axis lies in the second quadrant, X is not less than Xse and Y is not greater than Yse;
(3) when the angle of the calculated point to the X axis lies in the third quadrant, X is not less than Xse and Y is not less than Yse; and
(4) when the angle of the calculated point to the X axis lies in the fourth quadrant, X is not greater than Xse and Y is not less than Yse.

In another embodiment, the detecting circuit preferably further includes a sixth register storing information about whether or not the tangential angle of the currently calculated coordinate point lies in the first angular extent or in the second angular extent, and a second discriminator coupled to receive the output signals EQx, EQy and EQxy from the first and second comparators and the first discriminator and to respond to the content of the sixth register to selectively output one of the output signals EQx, EQy and EQxy.

The above and other objects, features and advantages of the present invention will be apparent from the following description of preferred embodiments of the invention with reference to the accompanying drawings.

BRIEF DESCRIPTION OF THE DRAWINGS

FIG. 2 is a block diagram of a first embodiment of the circuit in accordance with the present invention for detecting the end point of an arc;

DESCRIPTION OF THE PREFERRED EMBODIMENT

Figure 1:
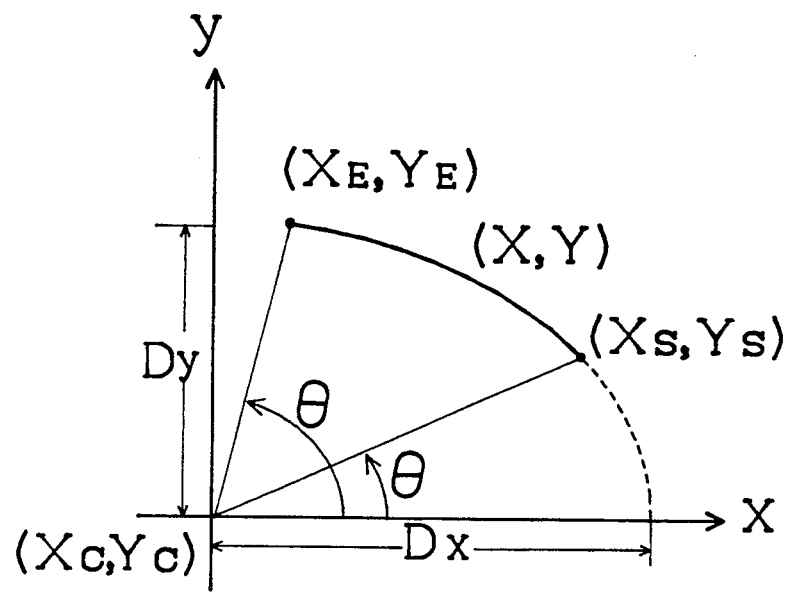
FIG. 1 illustrates one example of a conventional manner of calculating the end point of an elliptic arc.

Referring to FIG. 2, there is shown a a block diagram of a first embodiment of the circuit in accordance with the present invention for detecting the end point of an arc. The shown circuit comprises a unit 100 for sequentially calculating X coordinate values and Y coordinate values of a circular or elliptic pattern to be drawn, on the basis of a given data in accordance with the DDA algorithm. This unit is well known to persons in the art, and so, explanation will be omitted on the internal construction and operation of the unit itself.

The X coordinate value and the Y coordinate value calculated in the unit 100 are supplied and stored to a pair of registers 12 and 14, respectively. Also, an X coordinate value Xse and a Y coordinate value Yse of a given end point (a starting point and a terminating point) are stored in another pair of register 14 and 16. Furthermore, a quadrant information SP is stored in a register for the reason explained hereinafter.

The registers 10 and 14 are coupled to an X comparator 20, which generates a coincidence signal EQx when the two input values X and Xse are coincident. Further, the X comparator 20 generates a noncoincidence signal GRx when X is less than Xse. On the other hand, the registers 12 and 6 are coupled to an Y comparator 22, which generates a coincidence signal EQy when the two input values Y and Yse are coincident. Further, the Y comparator 22 generates a noncoincidence signal GRy when Y is less than Yse.

These outputs of the X comparator 20 and the Y comparator 22 are supplied to an XY discriminator 24 which also receives the quadrant information from the register 18 and generates a third coincidence signal EQxy when a condition explained hereinafter is satisfied.

Figure 5:
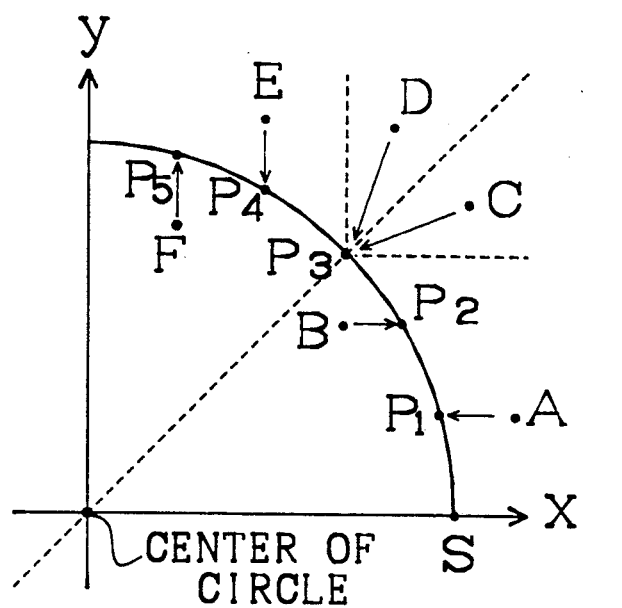
FIG. 5 illustrates a manner in accordance with the present invention of detecting the end point of a circular arc.
Figure 3:
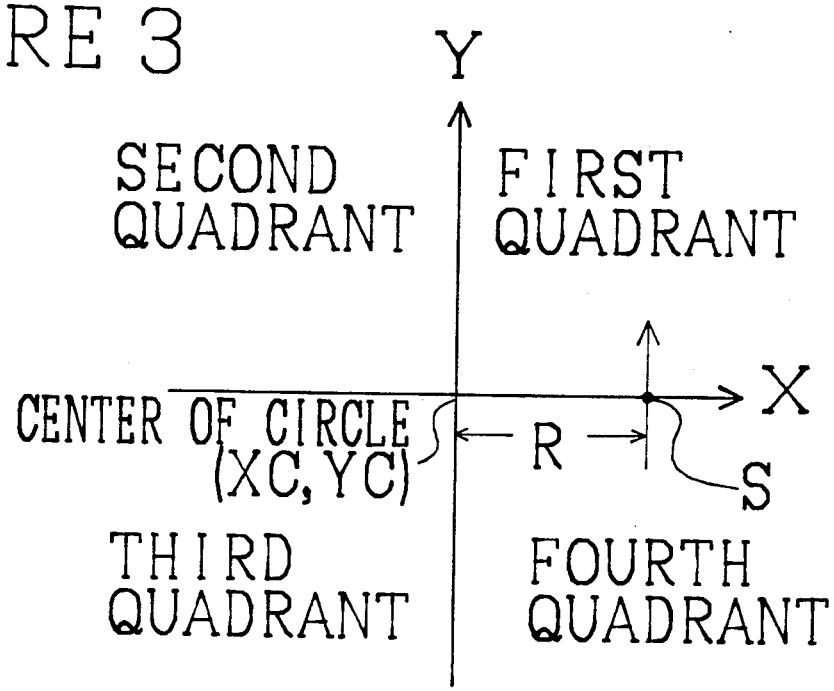
FIG. 3 illustrates four quadrants in a two dimensional plane.
Figure 4:
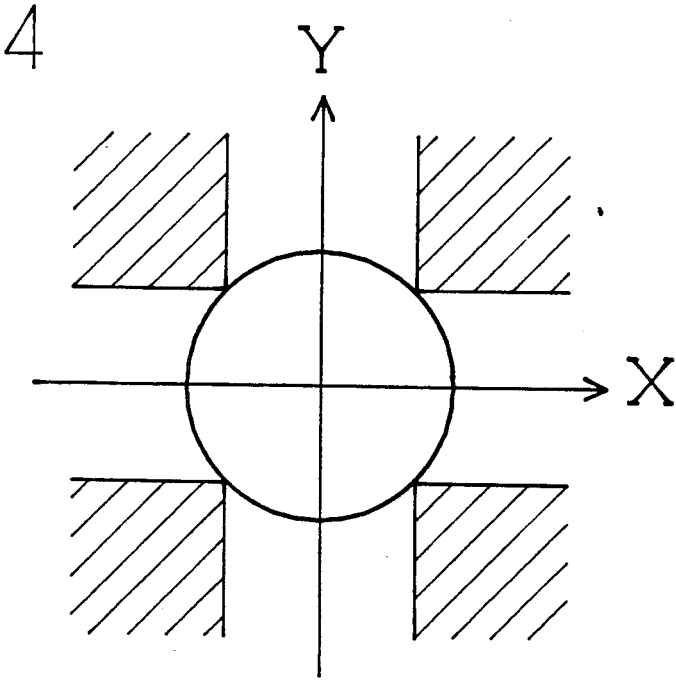
FIG. 4 illustrates an operation region of the XY discriminator used in the circuit shown in FIG. 2.

Now, explanation will be made on an operation of the above mentioned circuit in the case of detecting an end point of a circular arc with reference to FIGS. 3, 4 and 5. First, as shown in FIG. 3, consideration is based on such a assumption that a two dimensional plane is divided into four quadrants having their center on a center (Xc, Yc) of a circle to be drawn, and a circular pattern generation starting point is put on a point S on the X axis separate from the center (Xc, Yc) by a radius R. Respective points of the circular pattern are sequentially counterclockwise calculated point by point starting from the point S. Further, the calculated coordinate values of the respective points of the pattern are sequentially stored in the registers 10 and 12, respectively, and the quadrant information SP (indicating which of the quadrants the coordinate values stored in the register 10 and 12 lies in) is stored in the register 18. On the other hand, the coordinate values (Xse, Yse) of the given end point of the circular arc are previously set in the registers 14 and 16.

As mentioned above, the X comparator 20 generates the coincidence signal EQx when X is equal to Xse and also generates the noncoincidence signal GRx when X is less than Xse. Further, the Y comparator 22 generates the coincidence signal EQy when Y is equal to Yse and also generates the noncoincidence signal GRy when Y is less than Yse. On the other hand, the XY discriminator 24 generates the coincidence signal EQxy when there is satisfied any of the following conditions:

(1) first quadrant: X is not greater than Xse and Y is not greater than Yse
(2) second quadrant: X is not less than Xse and Y is not greater than Yse
(3) third quadrant: X is not less than Xse and Y is not less than Yse
(4) fourth quadrant: X is not greater than Xse and Y is not less than Yse The areas satisfying the above mentioned conditions are shown in hatching in FIG. 4. These hatched areas are called a setting inhibition area. In other words, the XY discriminator 24 generates the coincident signal EQxy satisfying the following logical expression:

$$EQxy = (EQx + GRx) \cdot (EQy + GRy) \cdot (SP = I) +$$

$$\overline{GRx} \cdot (EQy + GRy) \cdot (SP = II) + \overline{GRx} \cdot \overline{GRy} \cdot (SP = III) +$$

$$(EQx + GRx) \cdot \overline{GRy} \cdot (SP = VI)$$

In the second to fourth quadrants, one or both of the X coordinate value and the Y coordinate value may be negative, and therefore, this embodiment executes arithmetic operation of signed values. However, modification can be made so as to execute operation of absolute values.

Now, operation of the circuit shown in FIG. 2 will be described with a mind to the above mentioned matters and with an assumption that an end point of a circular arc to be drawn lies in the first quadrant for simplification of explanation.

In general, in the circular pattern generation algorithm based on the DDA, the processing is changed when a currently generated point has a tangential angle of 45 degrees. Therefore, it is not difficult to change the circular arc end point detecting condition on the basis of the inclination of a line tangent to the generated point, and so, this embodiment divides the detection condition into three; a first is for a case that the inclination angle of the tangential line to the X axis is greater than 45 degrees, a second is for a case that the tangential line inclination angle is less then 45 degrees, and a third is for a case that the tangential line inclination angle is equal to 45 degrees. For this purpose, when the inclination angle is not greater then 45 degrees, the X comparator 20 is activated by a signal 26, and when the inclination angle is not less then 45 degrees, the Y comparator 22 is activated by a signal 28. Further, when the inclination angle is equal to 45 degrees, the XY discriminator 24 is activated by a signal 30.

The unit 100 sequentially counterclockwise calculates respective coordinate values along a calculated circular pattern from the starting point S. Since the inclination of the tangential line of the starting point S is greater than 45 degrees as seen from FIG. 5, the Y comparator 12 is activated by the signal 28 to compare the Y coordinate value Yse previously stored in the register 16 with the calculated Y coordinate value Y stored in the register 12. During a period that the inclination of the tangential line is greater than 45 degrees, if the coincidence signal EQy is generated from the Y comparator 22, the point calculated at that time is detected as an end point of the given circular arc. As a result, even if the end point of the circular arc is deviated from the actually calculated point as in the case of points A and B as shown in FIG. 5, the deviation is corrected so that the end point of the circular arc can be detected when the P1 and P2 are calculated.

When the calculated point is shown by P3, i.e., when the inclination of the tangential line of the calculated point is just equal to 45 degrees, both the X comparator 20 and the Y comparator 22 are activated by the signals 26 and 28, and also, the XY discriminator 24 is activated by the signal 30 to execute the above mentioned logic expression for the outputs from the X comparator 20 and the Y comparator 22 and the quadrant information SP from the register 18. If the coincidence signal EQxy is generated by the XY discriminator 24, the point at that time is detected as an end point of the given circular arc. As a result, even if the end point is deviated and set in the hatched region shown in FIG. 4 as in the case of points C and D, the end point is correctly modified to a point P3.

When the inclination of the tangential line of the calculated point is less than 45 degrees, the X comparator 10 is activated by the signal 26 to compare the X coordinate value Yse previously stored in the register 14 with the calculated X coordinate value X stored in the register 10. If the coincidence signal EQx is generated from the X comparator 22, the point calculated at that time is detected as an end point of circular arc. As a result, even if the end point of the circular arc is deviated from the actually calculated point as in the case of points E and F as shown in FIG. 5, the deviation is corrected so that the end point of the circular arc can be detected when the P4 and P5 are calculated.

Thus, the end point detection in the first quadrant has been executed, but the end point detection can be made in the other quadrants in a similar manner. Namely, if the angle of the calculated point to the X axis is larger than 45 degrees but less than 135 degrees, or if the angle of the calculated point is larger than 225 degrees but less than 315 degrees, the detection is made by using the X comparator 20. On the other hand, if the angle of the calculated point to the X axis is larger than 135 degrees but less than 225 degrees, or if the angle of the calculated point is larger than 315 degrees but less than 360 degrees, the detection is made by using the Y comparator 22. Further, when the angle of the calculated point to the X axis is equal to 135 degrees, 225 degrees or 315 degrees, the detection is made by using the XY discriminator 24. In addition, in the case of detecting an end point of an elliptic arc, the detection can be similarly executed by dividing the detection manner into the three cases in accordance with whether or not the inclination of the tangential line is greater or less than or equal to 45 degrees.

Figure 6:
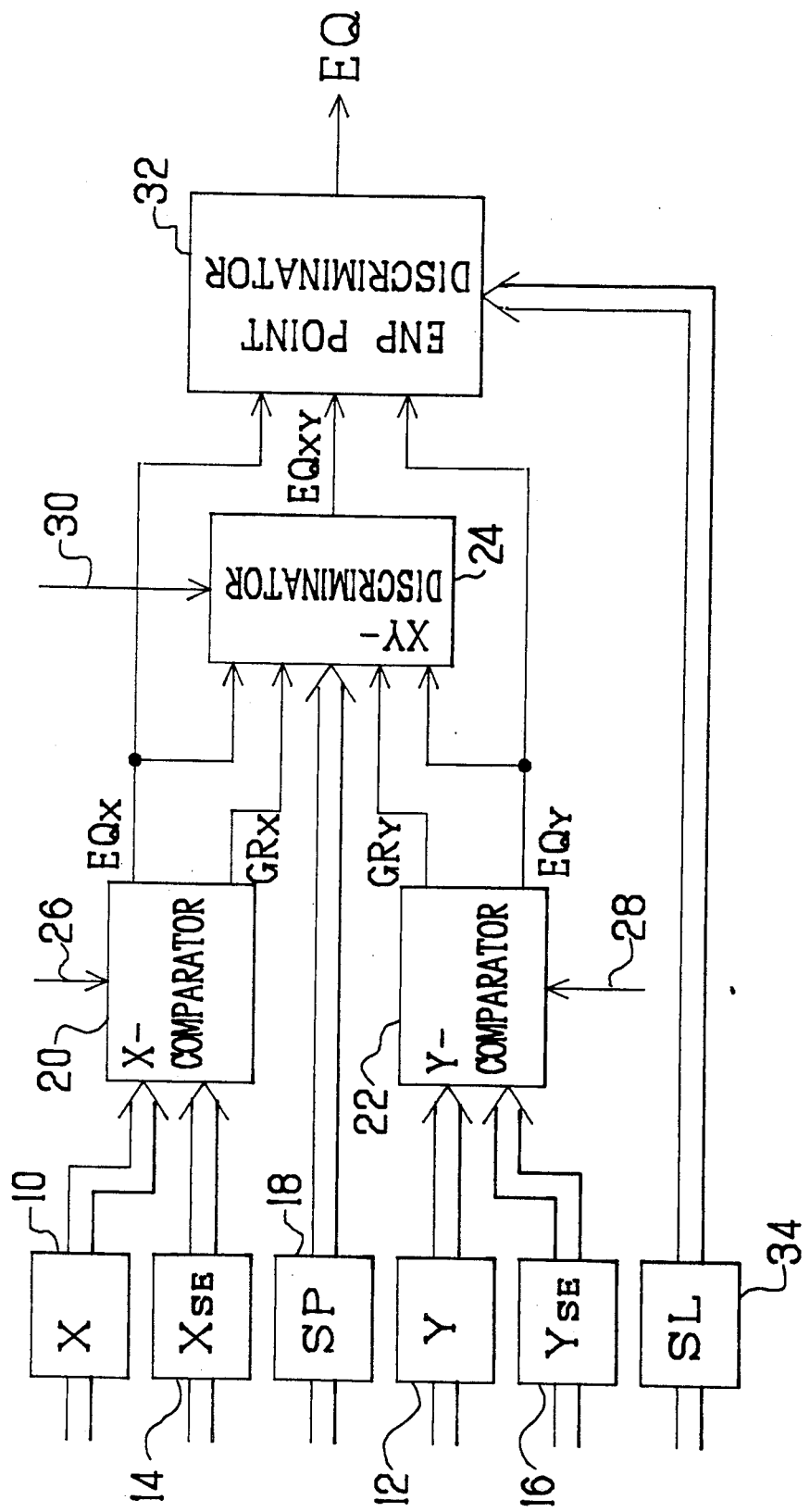
FIG. 6 is a block diagram of a second embodiment of the circuit in accordance with the present invention for detecting the end point of an arc.

Turning to FIG. 6, there is shown a block diagram of a second embodiment of the circuit in accordance with the present invention for detecting the end point of an arc. In FIG. 6, elements similar to those shown in FIG. 2 are given the same Reference Numerals and explanation thereof will be omitted.

As seen from comparison between FIG. 2 and 6, the second embodiment shown in FIG. 6 has an end point discriminator 32 and a tangential line inclination angle register 34 in addition to the circuit elements shown in FIG. 2. On the other hand, for simplification of the drawing, there is omitted the unit 100 for sequentially calculating X coordinate values and Y coordinate values of a pattern to be drawn, on the basis of a given data in accordance with the DDA algorithm. The tangential angle register 34 stores the information about whether or not the tangential angle of the currently generated coordinate point is greater or less than or equal to 45 degrees. On the other hand, the end point discriminator 32 receives the output signals EQx, EQy and EQxy from the X and Y comparators 20 and 22 and the XY discriminator 24 and operates to select one of the input signals on the basis of the content of the tangential angle register 34.

Explanation will be made only on an operation different from that of the circuit shown in FIG. 2. when the unit for sequentially calculating X coordinate values and Y coordinate values of a pattern to be drawn generates a circular pattern on the basis of the DDA algorithm, the information about whether or not the tangential angle of the currently generated coordinate point is greater or less than or equal to 45 degrees is stored in the tangential angle register 34. Similarly to the first embodiment, the X and Y comparators 20 and 22 and the XY discriminator 24 operate to generate the coincidence signals EQx, EQy and EQxy, respectively, when the end point is detected. The end point discriminator 32 operates, on the basis of the tangential angel information from the register 34, to output the coincidence signal EQy when the tangential angle is greater than 45 degrees, the coincidence signal EQx when the tangential angel is less than 45 degrees, and the coincidence signal EQxy when the tangential angle is equal to 45 degrees. Therefore, by watching only the output of the end point discriminator 32, the end point can be detected.

As seen from the above, even if the starting point and/or the terminating point of an arc to be drawn is set in deviation from the actually calculated coordinate value, the deviation is corrected and the corrected point can be detected. Therefore, a high degree of precision is not required in the arithmetic operation for obtaining the coordinates of the starting point and the terminating point of a given arc. Accordingly, the time for he pre-processing can be made smaller than the conventional system, and so, the total time of the processing can be decreased. In addition, even if mistaken coordinate values are set due to a calculation error, therewill occur no situation that the processing cannot terminate because the starting point or the terminating point cannot be found.

Further, the above mentioned embodiments is adapted to divide the detection manner by the tangential angle of 45 degrees. However, the detection manner can be divided by any acute tangential angel to the X axis.

The invention has thus been shown and described with reference to the specific embodiments. However, it should be noted that the present invention is in no way limited to the details of the illustrated structures but changes and modifications may be made within the scope of the appended claims.

I claim:

1. A circuit for detecting, on the basis of an X coordinate value and a Y coordinate value of a given end point, an end point of an arc to be drawn, and for generating a detection signal, comprising:

a first register for temporarily storing an X coordinate value Xse of a given end point, a second register for temporarily storing a Y coordinate value Yse of said given end point, means for sequentially generating an X coordinate value X and a Y coordinate value Y of points on a circle or ellipse, in an order starting from a predetermined point on said circle or ellipse, to form an arc to be drawn, a first comparator coupled to said first register and said generating means for comparing said X coordinate value Xse of said given end point with said X coordinate value X of a point on said circle or ellipse and sequentially generated by said generating means, said first comparator generating a first coincidence signal EQx when said X coordinate value Xse of said given end point is coincident with said X coordinate value X generated by said generating means, a second comparator coupled to said second register and said generating means for comparing said Y coordinate value Yse of said given end point with said Y coordinate value Y of said point on said circle or ellipse and sequentially generated by said generating mean, said second comparator generating a second coincidence signal EQy when said Y coordinate value Yse of said given end point is coincident with said Y coordinate value Y generated by said generating means, means for discriminating whether an inclination of a tangent to said circle or ellipse at a point having said X coordinate value X and said Y coordinate value Y generated by said generating means is within a first angular extent or within a second angular extent different form said first angular extent, said discriminating means being coupled to receive said first and second coincidence signals EQx and EQy for outputting, as a detection signal, said first coincidence signal EQx when said inclination si within said first angular extent and said second coincidence signal EQy when said inclination is within said second angular extent, whereby a point having said X coordinate value X and said Y coordinate value Y generated by said generating means when said detection signal is outputted by said discriminating means is indicative of an end point of an arc to be drawn.

2. A circuit claimed in claim 1 wherein said first comparator further generates a first noncoincidence signal GRx when Xse is greater than X, and said second comparator further generates a second noncoincidence signal GRy when Yse is greater than Y.

3. A circuit claimed in claim 2 wherein said discriminating mean is coupled to receive said first and second coincidence and noncoincidence signals EQx, EQy, GRx and GRy form said first and second comparators, said discriminating means operating to discriminate whether or not a condition for coincidence between said given end point and said point having said X coordinate value X and said Y coordinate value Y generated by said generating means is satisfied by said first and second coincidence and noncoincidence signals EQx, EQy, GRx and GRy and whether or not said inclination is at a border between said first angular extent and said second angular extent, said discriminating means generating a third coincidence signal EQxy when said condition for coincidence is satisfied and when said inclination is at said border.

4. A circuit claimed in claim 3 further including a third register storing information indicating the quadrant in which said point having said X coordinate value X and said Y coordinate value Y generated by said generating means lies, said discriminating means being coupled to said third register.

5. A circuit claimed in claim 3 wherein said discriminating means operates to discriminate whether said inclination is greater or less than 45 degrees, said discriminating means outputting, as a detection signal, said first coincidence signal when said inclination is less than 45 degrees, and said second coincidence signal when said inclination is greater than 45 degrees.

6. A circuit claimed in claim 3 wherein said discriminating means discriminates (1) whether an angle of said point having said X coordinate value X and said Y coordinate value Y generated by said generating means against an X axis is greater than 0 degrees but less than 45 degrees, (2) whether said angle is greater than 45 degrees but less than 135 degrees, (3) whether said angle is greater than 135 degrees but less than 225 degrees, (4) whether said angle is greater than 225 degrees but less than 315 degrees, and (5) whether said angle is greater than 315 degrees but less than 360 degrees, said discriminating means outputting, as a detection signal, said first coincidence signal when said angle is greater than 45 degrees but less than 135 degrees, or when said angle is greater than 225 degrees but less than 315 degrees, and the second coincidence signal EQy when said angle is greater than 0 degree but less than 45 degrees, or when said angle is greater than 135 degrees but less than 225 degrees, or when said angle is greater than 315 degrees but less than 360 degrees.

7. A circuit claimed in claim 6 wherein said discriminating means discriminates whether or not said angle is equal to 45 degrees, 135 degrees, 225 degrees or 315 degrees, said discriminating means generating said third coincidence signal EQxy when said condition for coincidence is satisfied by said first and second coincidence and noncoincidence signal EQx, EQy, GRx and GRy and when said angle is equal to 45 degrees, 135 degrees, 225 degrees or 315 degrees.

8. A circuit claimed in claim 6 wherein said discriminating means discriminates whether or not each of the following four conditions is satisfied:
(1) when said angle lies in the first quadrant, X is not greater than Xse and Y is not greater than Yse;
(2) when said angle lies in the second quadrant, X is not less than Xse and Y is not greater than Yse;
(3) when said angle lies in the third quadrant, X is not less than Xse and Y is not less than Yse; and
(4) when said angle lies in the fourth quadrant, X is not greater than Xse and Y is not less than Yse,
said discriminating means operating to generate said third coincidence signal EQxy when one of said four conditions is satisfied.

9. A circuit claimed in claim 3 further including a fourth register for storing information indicating whether or not the tangential range of the currently calculated coordinate point lies in the first angular extent or in the second angular extent, and a second discriminator coupled to receive said signals EQx, EQy and EQxy from said first and second comparators and said discriminating means and to respond to the content of said fourth register to selectively output one of said signals EQx, EQy and EQxy.

10. A circuit for detecting, on the basis of an X coordinate value and a Y coordinate value of a given end point, an end point of an arc to be drawn, and for generating a detection signal, comprising:
a first register for temporarily storing an X coordinate value Xse of said given end point,
a second register for temporarily storing a Y coordinate value Yse of said given end point,
means for sequentially generating an X coordinate value X and a Y coordinate value Y of points on a circle or ellipse, in an order starting form a predetermined point on said circle or ellipse, to form an arc to be drawn,
a first comparator coupled to said first register and said generating means for comparing said X coordinate value Xse of said given end point with said X coordinate value X of a point on said circle or ellipse and sequentially generated by said generating means, said first comparator generating a first signal EQx when said X coordinate value Xse of said given end point is coincident with said X coordinate value X generated by said generating means and a second signal GRx when said X coordinate value Xse of said given end point is greater than said X coordinate value X generated by said generating means,
a second comparator coupled to said second register and said generating means for comparing said Y coordinate value Yse of said given end point with said Y coordinate value Y of said point on said circle or ellipse and sequentially generated by said generating means, said second comparator generating a third signal EQy when said Y coordinate value Yse of said given end point tis coincident with said Y coordinate value Y generated by said generating means and a fourth signal GRy when said Y coordinate value Yse of said given end point is greater than said Y coordinate value Y generated by said generating means,
means for discriminating whether an inclination of a tangent to said circle or ellipse at a point having said X coordinate value X and said Y coordinate value Y generated by said generating means is greater or less than or equal to 45 degrees, said discriminating means being coupled to receive said first, second, third and fourth signals for outputting, as a detection signal, said first signal when said inclination is less than 4 5degrees and said third signal when said inclination is greater than 45 degrees, said discriminating means also generating said detection signal in response to at leas tone of said first and second signals an at least one of said third and fourth signals when said inclination is equal to 45 degrees,
whereby a point having said X coordinate value X and said Y coordinate value Y generated by said generating means when said detection signal is outputted by said discriminating means is indicative of an end point of an arc to be drawn.

* * * * *